US011502494B2

(12) United States Patent
Clement et al.

(10) Patent No.: US 11,502,494 B2
(45) Date of Patent: Nov. 15, 2022

(54) AERIAL CABLE SPACER INSULATOR

(71) Applicant: Marmon Utility LLC, Milford, NH (US)

(72) Inventors: Charles Clement, Pelham, NH (US); Jordan Barthol, Nashua, NH (US); Shravani Talabathula, Groton, MA (US); Edward Laughlin, Lowell, MA (US); Guberson Mercedat, Andover, MA (US)

(73) Assignee: Marmon Utility LLC, Milford, NH (US)

( * ) Notice: Subject to any disclaimer, the term of this patent is extended or adjusted under 35 U.S.C. 154(b) by 0 days.

(21) Appl. No.: 17/734,630

(22) Filed: May 2, 2022

(65) Prior Publication Data

US 2022/0255307 A1    Aug. 11, 2022

Related U.S. Application Data

(62) Division of application No. 16/925,749, filed on Jul. 10, 2020.

(51) Int. Cl.
*H02G 7/12* (2006.01)
*H02G 7/05* (2006.01)

(52) U.S. Cl.
CPC .............. *H02G 7/12* (2013.01); *H02G 7/053* (2013.01)

(58) Field of Classification Search
CPC ........... H02G 7/12; H02G 7/053; H02G 17/02
See application file for complete search history.

(56) References Cited

U.S. PATENT DOCUMENTS

| 2,912,482 | A | * | 11/1959 | Miller | H02G 7/12 |
| | | | | | 174/41 |
| 3,076,865 | A | * | 2/1963 | Volk | H02G 7/12 |
| | | | | | 174/DIG. 12 |
| 3,268,655 | A | * | 8/1966 | William | H02G 7/12 |
| | | | | | 174/41 |
| 3,300,576 | A | * | 1/1967 | Hendrix | H02G 7/12 |
| | | | | | 174/173 |
| 3,582,983 | A | * | 6/1971 | Claren | H02G 7/125 |
| | | | | | 174/42 |
| 3,613,104 | A | * | 10/1971 | Bradshaw | H02G 7/125 |
| | | | | | 174/42 |
| 3,617,609 | A | * | 11/1971 | Tuttle | H02G 7/125 |
| | | | | | 188/380 |

(Continued)

*Primary Examiner* — William H. Mayo, III
*Assistant Examiner* — Rhadames Alonzo Miller
(74) *Attorney, Agent, or Firm* — Levenfeld Pearlstein, LLC

(57) ABSTRACT

A cable spacer includes first and second angle arms each having a cable engaging end at one end and a flat tab portion at an opposite end having a connecting tab and an aperture to connect the arms to each other. An insulator extends between and connects the angle arms at their respective connecting tabs. The insulator has a non-conductive core. The angle arms and insulator mounted to each other define a spacer plane. A bottom arm is mounted to and depends from insulator. The bottom arm is mounted to the insulator to sway into and out of the spacer plane. A clamp secures the cable spacer to a messenger and includes upper and lower clamp portions. The upper clamp portion mounts to the messenger and the lower clamp portion mounts to cable spacer angle arms. The lower clamp portion is rotatable relative to the upper clamp portion.

17 Claims, 6 Drawing Sheets

(56) References Cited

U.S. PATENT DOCUMENTS

| | | | | |
|---|---|---|---|---|
| 3,739,077 A * | 6/1973 | Winkelman | | H02G 7/12 174/149 R |
| 3,748,370 A * | 7/1973 | Dalia | | H02G 7/125 403/224 |
| 4,012,581 A * | 3/1977 | Hawkins | | H02G 7/125 174/42 |
| 4,020,277 A * | 4/1977 | La Chance, Sr. | | H02G 7/20 248/74.1 |
| 4,082,377 A * | 4/1978 | Saunders | | B60G 7/005 301/124.1 |
| 5,298,683 A * | 3/1994 | Taylor | | H01R 12/716 439/364 |
| 5,357,719 A * | 10/1994 | Lewis | | E04D 13/076 52/16 |
| 5,371,320 A * | 12/1994 | Torok | | H02G 7/125 174/42 |
| 5,394,297 A * | 2/1995 | Toedter | | G06F 1/1616 174/136 |
| 5,441,292 A * | 8/1995 | Busby | | B62K 25/30 280/284 |
| 5,700,980 A * | 12/1997 | Bello | | H02G 7/12 174/42 |
| 6,032,661 A * | 3/2000 | Goff | | F41B 5/1469 124/35.2 |
| 7,938,109 B1 * | 5/2011 | Larson | | F41B 5/10 124/25.6 |
| 9,022,357 B2 * | 5/2015 | Argyle | | H02G 7/12 254/134.3 R |
| 9,273,921 B2 * | 3/2016 | Koch | | F41B 5/10 |
| 9,444,240 B2 * | 9/2016 | Argyle | | H02G 7/12 |
| 10,145,380 B1 * | 12/2018 | Davis | | F04D 29/041 |
| 10,218,162 B2 | 2/2019 | Talabathula et al. | | |
| 2004/0251388 A1 * | 12/2004 | Williams | | F16M 11/24 248/274.1 |
| 2004/0251389 A1 * | 12/2004 | Oddsen, Jr. | | F16M 11/2014 248/279.1 |
| 2005/0121577 A1 * | 6/2005 | Oddsen, Jr. | | F16M 13/02 248/225.11 |
| 2007/0268654 A1 * | 11/2007 | Gory | | H01R 11/28 361/600 |
| 2009/0136291 A1 * | 5/2009 | McClanahan | | E02F 9/006 16/2.4 |
| 2010/0269808 A1 * | 10/2010 | Evans | | F41B 5/10 124/86 |
| 2013/0026729 A1 * | 1/2013 | King | | B62K 21/18 280/270 |
| 2013/0283968 A1 * | 10/2013 | Smith | | F04B 47/14 74/590 |
| 2014/0138145 A1 * | 5/2014 | Argyle | | H02G 7/12 174/40 R |
| 2016/0339985 A1 * | 11/2016 | Lund | | G05G 1/04 |
| 2018/0274624 A1 * | 9/2018 | Karpenko | | F16F 15/085 |
| 2021/0190237 A1 * | 6/2021 | Bell | | H02G 3/263 |

* cited by examiner

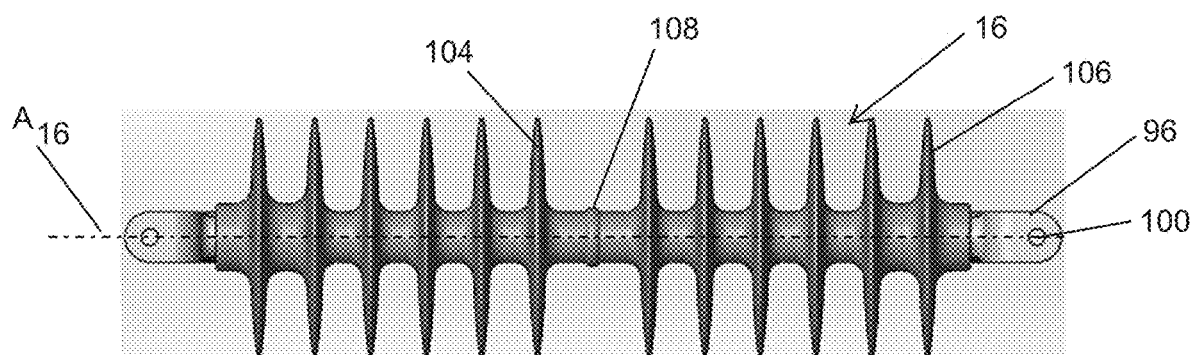
FIG. 5
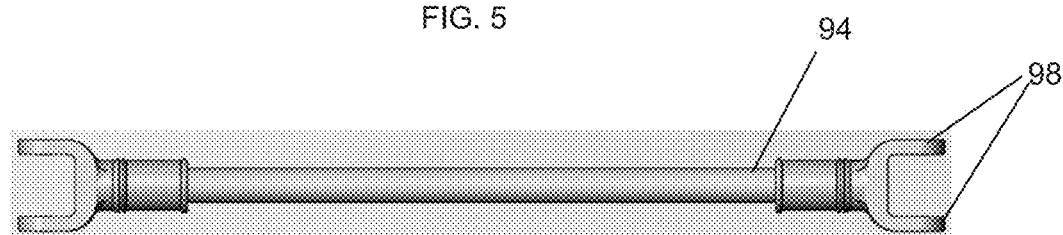
FIG. 6
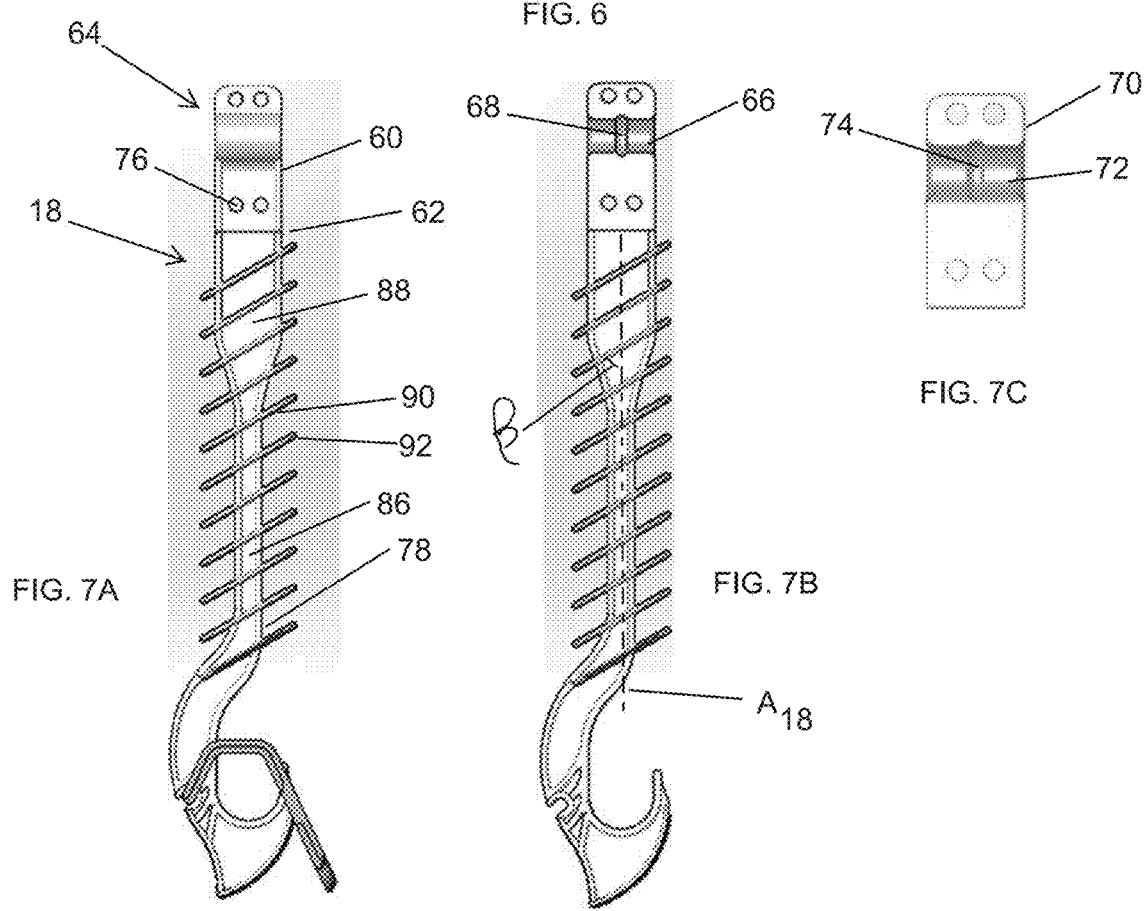
FIG. 7A
FIG. 7B
FIG. 7C

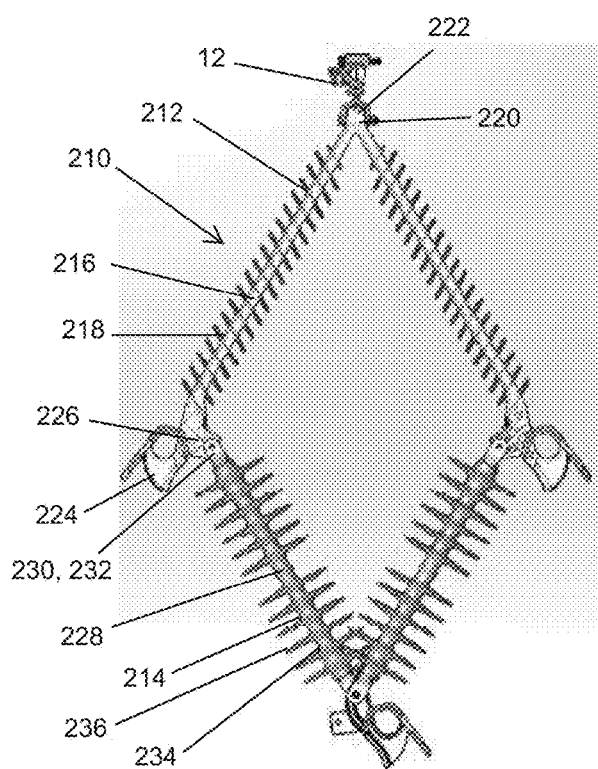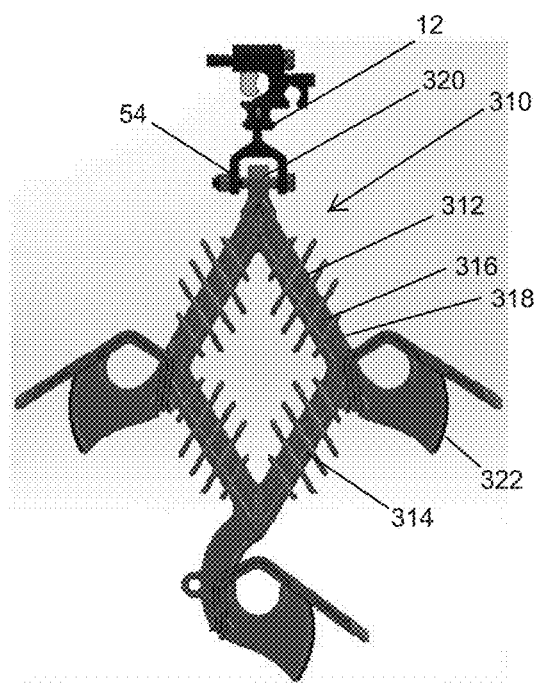
FIG. 8
FIG. 9

AERIAL CABLE SPACER INSULATOR

CROSS-REFERENCE TO RELATED APPLICATION DATA

This application is a division of U.S. patent application Ser. No. 16/925,749, filed Jul. 10, 2020, titled AERIAL CABLE SPACER INSULATOR, the disclosure of which is incorporated herein in its entirety.

BACKGROUND

The present disclosure relates to a system for supporting and spacing high voltage aerial cables from a support cable or messenger cable, and more particularly, high voltage aerial covered cables.

Electric power transmission and distribution commonly relies upon cables strung overhead. Some of these cables are bare conductors, other cables are covered, that is a conductor having a covering, such as a high density polyethylene (HDPE) covering. Overhead cables are often suspended from support cables or messenger cables (referred to herein as messenger or messengers) that are typically made of high strength alloys. The messengers are supported on poles or towers. Cable spacers, which also serve as insulators, are arranged at spaced intervals along the messenger and support the cables.

Often, a single spacer is used to support three cables in a three-phase system, simultaneously maintaining spaced relation between each of cables. Typically, spacers are attached to the messenger and to the cables in order to save space and to maintain appropriate distances between suspended cables.

One known spacer system, such as that disclosed in Bello et al., U.S. Pat. No. 5,700,980, discloses an aerial cable spacer and support that is fabricated from separate arm members and braces. The arms and braces are joined to form an open frame structure that is hung from a messenger wire. Fins formed on and at acute angles to the arms and braces increase the leakage distance between cable phases and with ground.

Another known spacer system, such as that disclosed in Talabathula et al., U.S. Pat. No. 10,218,162 for supporting and spacing aerial cables of high voltage of 69 kV or above, includes a top piece configured to engage the messenger, first, second, and third arms, each having ends connected to the top piece and a cable fastening system located at opposite ends of each of the first, second, and third arms.

While known systems solved early problems associated with supporting high voltage AC cables from a single spacer so as to provide sufficient space between the cables, these systems may not provide optimum degrees of freedom of movement of the spacer system to accommodate sway and movement of the cables with high winds, and wind loading.

Accordingly, there is a need for a high voltage aerial cable spacer insulator. Desirably, such a spacer can support cables with sufficiently high degrees of freedom of movement to accommodate sway and movement of the cables with high winds, ice loading, and inadvertent contact. More desirably still, such a spacer can also accommodate other, non-power transmission cables, such as a fiber optic cable, in a configuration such that there is no interference between the power cables and the non-power transmission cable.

SUMMARY

An aerial cable spacer insulator supports cables with sufficiently high degrees of freedom of movement to accommodate sway and movement of the cables with high winds, ice loading, and inadvertent contact situations. Embodiments can also accommodate other, non-power transmission cables, such as a fiber optic cable, in a configuration such that there is no interference between the power cables and the non-power transmission cable. For purposes of the present disclosure, reference to cable or cables is to an aerial covered cable or cables and reference to messenger is to messenger cable.

In embodiments, the aerial cable spacer insulator includes first and second angle arms, each having a cable engaging end at a first end and a flat tab portion at a second end. The first ends include a connecting tab. The flat tabs each include an aperture to accommodate a connecting element to connect the first and second arms to each other.

An insulator extends between and connects the angle arms. The insulator mounts to the angle arms at their respective connecting tabs. The insulator has a core formed from a non-conductive material, such as fiberglass. The angle arms and the insulator mount to each other to define a spacer plane.

A bottom arm is mounted to and depends or suspends from the insulator. The bottom arm is mounted to the insulator to sway into and out of the spacer plane.

In an embodiment, the angle arm connecting tabs extend generally transverse to a longitudinal axis of its respective angle arm. The connecting tabs can include strengthen ribs extending along the connecting tabs.

The flat tabs can include bushings positioned in their respective apertures. The bushings can include bearing faces that face one another and can include an anti-rotational feature.

In embodiments, the angle arms, bottom arm and insulator can include fins disposed generally therearound.

A messenger clamp can be mounted to the angle arms at about the flat tabs. In embodiments, the messenger clamp includes an upper clamp portion and a lower clamp portion. The upper clamp portion is mounts to a messenger cable and the lower clamp portion mounts to the cable spacer angle arms. In embodiments, the lower clamp portion is rotatable relative to the upper clamp portion.

The upper clamp portion can include a receiver and the lower clamp portion can include a connecting portion that cooperates with the receiver. The connection portion is rotatable within the receiver.

The receiver can include a pair of opposing side walls that have aligned openings for receiving a locking element, such as a locking pin, to secure the connecting portion in the receiver. The receiver includes a bottom wall having slotted opening extending partially into the bottom wall. Cooperating with the bottom wall slotted opening, the connecting portion includes a head and a neck, such that the head is positioned in the receiver and the neck extends through the slotted opening.

In embodiments, the lower clamp portion includes a clevis having a pair of opposing side walls having aligned openings for receiving a fastener for securing the lower clamp portion to the angle arm bushings.

In embodiments, the clamp can include a secondary clamp element side-mounted to the upper clamp portion. The secondary clamp element can be positioned on the upper clamp portion, and can be configured to secure, for example, a fiber optic cable.

Other aspects, objectives and advantages will become more apparent from the following detailed description when taken in conjunction with the accompanying drawings.

BRIEF DESCRIPTION OF THE DRAWINGS

The benefits and advantages of the present embodiments will become more readily apparent to those of ordinary skill in the relevant art after reviewing the following detailed description and accompanying drawings, wherein:

FIG. 5 is a front view of an embodiment of a center insulator;

FIG. 6 is a front view of an example of a central support member of the central insulator, the support member being rotated 90 degrees from the view of FIG. 5;

FIG. 7A is a front or rear view of an embodiment of a bottom arm;

FIG. 7B is a view similar to FIG. 7A with the front of the upper clamp member removed for clarity of illustration;

FIG. 7C is an enlarged, partial view of the upper clamp member of FIG. 7B;

FIG. 8 is a front view of an alternate embodiment of a spacer;

FIG. 9 is a front view of yet another embodiment of a spacer; and

DETAILED DESCRIPTION

Figure 1:
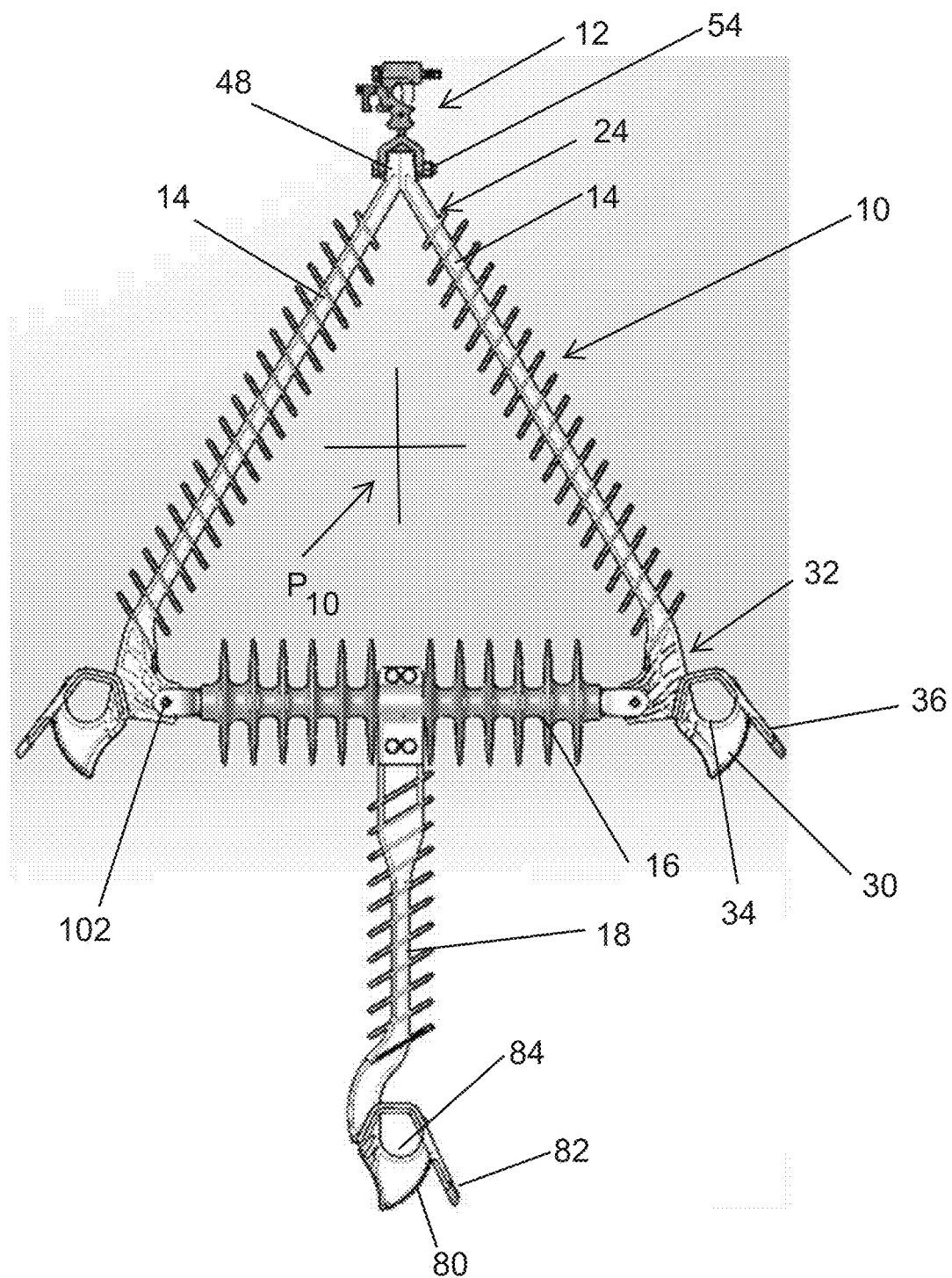
FIG. 1 is a front view illustrating an embodiment of an aerial cable spacer insulator.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

FIG. 1 illustrates one example of an aerial cable spacer insulator 10 (referred to as "spacer") and messenger clamp 12 for supporting the spacer 10 from a messenger. The illustrated spacer 10 and clamp 12 provide higher strength members and additional degrees of freedom of movement over known spacer and clamp arrangements.

The spacer 10 includes, generally, a pair of angle arms 14, central insulator 16 and a bottom arm 18. In an embodiment, the angle arms 14 can be identical or mirror images of each other and, along with the central insulator 16, form an isosceles triangle. The bottom arm 18 is mounted to, and extends downwardly from, the central insulator 16 as will be described in more detail below.

Figure 3:
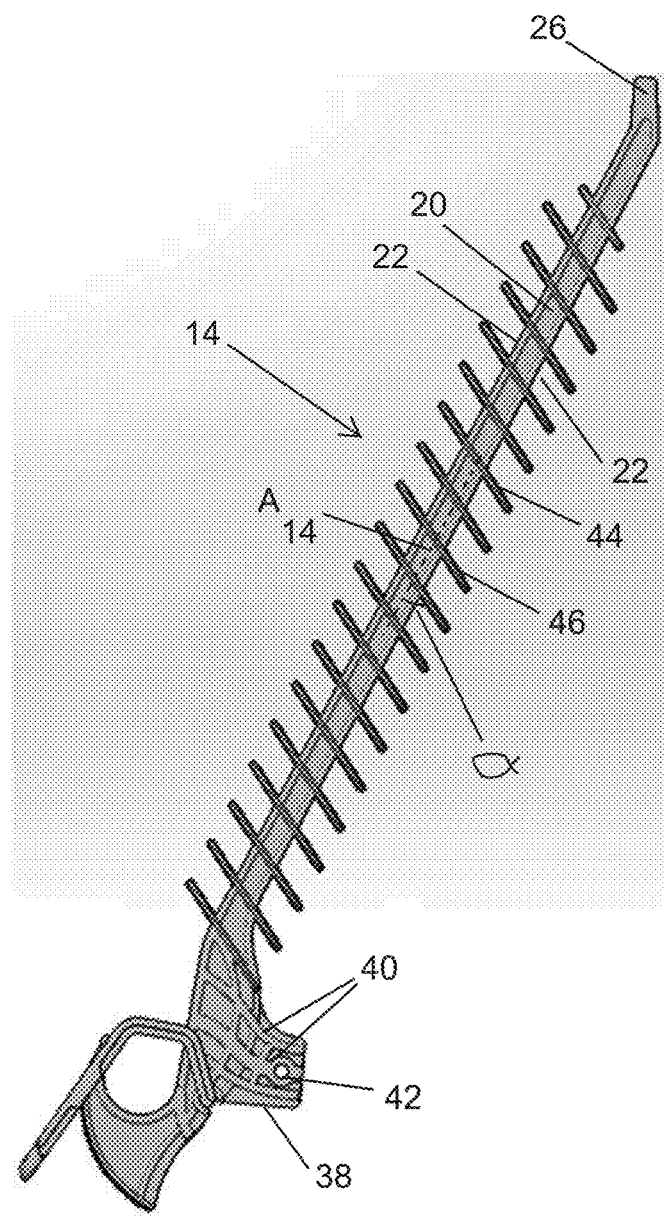
FIG. 3 is a front or rear view of an embodiment of an angle arm.
Figure 4A:
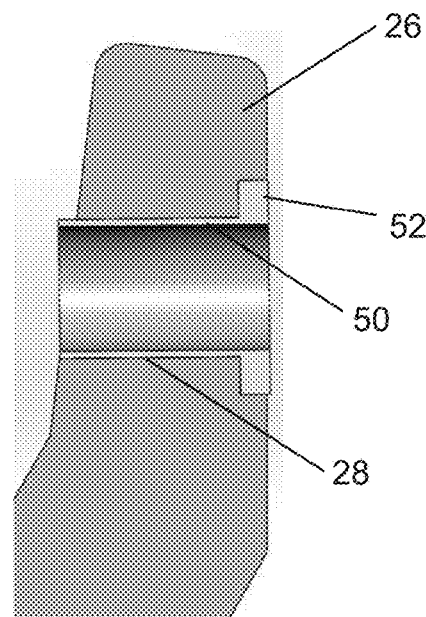
FIG. 4A is an enlarged, partial sectional view of the clamp mounting portion of the angle arm and showing a bushing in the clamp mounting portion.
Figure 4B:
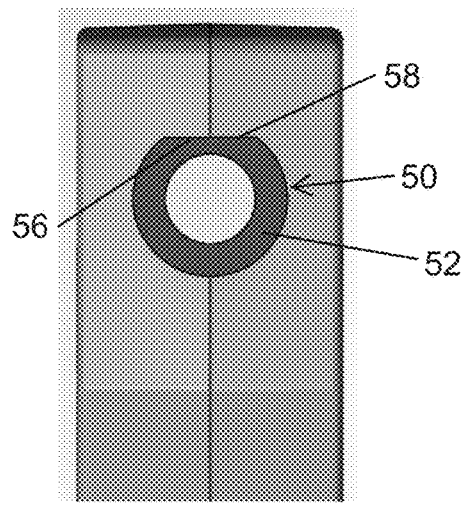
FIG. 4B is a side view of the clamp mounting portion of the angle arm, and illustrating an anti-rotation feature of the bushing.

Referring to FIGS. 3 and 4A-4B, the angle arms 14 are formed having a central, relatively flat central portion 20 flanked by transverse flanges 22 that extend equally to both sides of the central portion 20 giving the angle arms 14 an I-beam cross-section. At a first end 24 of the arms 14 the flanges 22 merge into a flat tab 26 which has an aperture 28 therethrough as best seen in FIG. 4A. A cable hook 30 is formed at a second end 32 of each arm 14. The cable hook 30 has a round bottom cable saddle or seat 34. A retaining member 36 is pivotally mounted to the arm 14, at about the saddle 34 and pivots between an open state in which a cable can be positioned in and removed from the hook 30, and a closed state in which the retaining member 36 is pivoted over the open portion of the saddle 34 to secure the cable in place in the hook 30.

A connecting tab 38 is positioned adjacent the cable hook 30, generally on a side of the arm 14 opposite the hook 30. The tab 38 extends generally transverse to a longitudinal axis $A_{14}$ of the arm 14 and can be reinforced, such as by the inclusion of ribs 40 along the tab 38. An opening or bore 42 is formed in the tab 38 for mounting of the central insulator 16 as will be discussed in detail below.

The resistance to the flow of changing current in the cable with its attendant faulting of the cable is a function both of the effective length of and the resistivity of the spacer 10 surface. The effective spacer length is the length of the spacer surface in the leakage path between cables. The resistivity of the spacer 10 in that path, under all weather operating conditions, is dependent upon the accumulation of dust and other contaminants on and also the wetting of the spacer surface.

To increase the effective length of the path between the cables and between the cables and the grounded messenger, a series of fins 44 is placed about each of the arms 14. The fins 44 can be molded completely about the periphery of each of the arms 14. The outer edges 46 of the fins 44 can form a rectangle. The edges 46 of the fins 44 can be rounded and the fins 44 set at an angle α to the longitudinal axis $A_{14}$ of the arm 14 on which they are molded. Some of the fins 44 may be formed as partial fins.

In this manner, the leakage path along the arm 14 from a cable in the saddle 34 of the hook 30 will then be along the surface of the arm 14 and over each of the fins 44 to the grounded messenger in the messenger clamp 12. In embodiments, the arms 14 and fins 44 are formed having a relatively smooth surface to minimize the accumulation of dirt, moisture and other materials on these surfaces and to facilitate removal of these materials by wind or washing away by rain.

As noted above, the flanges 22 at the first end 24 of the arms 14 merge into a flat tab 26 having an aperture 28. Referring to FIG. 1, it can be seen that the flat tabs 26 of the angle arms 14 meet at an apex 48 with the flat surfaces of each tab 26 abutting each other. In this arrangement, the apertures 28 align with one another.

To allow the spacer 10 to move or sway in the direction parallel to the cables, a bushing 50 is positioned in and traverses through each of the apertures 48. In an embodiment each bushing 50 has a bearing face 52 with the bearing faces 52 of the arms 14 facing each other. The bushings 50 can be formed from a wide variety of materials, such as a metal, such as stainless steel, galvanized steel, chrome, nickel plated steel and other materials suitable for outdoor use and environments, as will be appreciated by those skilled in the art. As will be discussed in more detail below, a pin, such as a bolt 54, is positioned through the apertures/bushings 28/50 to secure the angle arms 14 to each other and to the messenger clamp 12. The metal bushings 50 will increase the life and durability of the connection between the spacer 10 and the clamp 12 as there is metal-to-metal contact between the bolt 54 and the bushings 50. In an embodiment, the bushings 50 are fixed within the apertures 28 to minimize movement between the bushings 50 and the angle arms 14.

The bushings 50 can be fixed by a flat portion 56 on a periphery of the bushing 50 that is fitted onto a flat portion 58 in the aperture 28.

The bottom arm 18 is formed in much the same manner as the angle arms 14, having a central, relatively flat central portion 20 flanked by transverse flanges 22 that extend equally to both sides of the central portion 20 giving the bottom arm 18 an I-beam cross-section. Unlike the angle arms 14, the bottom arm 18 has a tab 60 formed at a first end 62 that has a receiving portion 64 with a semi-circular channel 66. A recess 68 is formed in the channel 66 having a larger diameter than the channel 66. A clamp element 70 forms a complement to the receiving portion 64 having a semi-circular channel 72 and a recess 74 with a diameter larger than that of the channel 72. The tab 60 and clamp element 70 are secured to one another such that the semi-circular channels 66, 72 cooperate to form a circular through channel. Fasteners, such as bolts 76 can be used to removably secure the clamp element 70 to the tab 60.

A second end 78 of the bottom arm 18 is formed having a cable hook 80 and retaining member 82 similar to that of the angle arms 14 to allow for a cable to be positioned and secured in, and removed from the hook 80. As with the angle arms 14, the bottom arm the retaining member 82 is pivoted over the open portion of the saddle 84 to secure the cable in place in the hook 80 and pivoted out of the way to install the cable in, or remove the cable from the hook 80. In an embodiment, a lower longitudinal portion 86 of the bottom arm 18 (that portion nearer the hook 80) can be formed having narrower width than an upper longitudinal portion 88 (that portion nearer the tab 60).

As can be seen in FIGS. 7A and 7B, the bottom arm 18 is formed having a series of fins 90 placed about the arm 18 that can be molded completely about the periphery of the arm 18. The outer edges 92 of the fins 90 can form a rectangle and the edges 92 can be rounded, with the fins 92 set at an angle $\beta$ to the longitudinal axis $A_{18}$ of the arm 18. Some of the fins 92 may be formed as partial fins. The arm 18 and fins 92 are formed having a relatively smooth surface to minimize the accumulation of dirt, moisture and other materials on these surfaces and to facilitate removal of these materials by wind or washing away by rain.

The central insulator 16 extends between and joins the angle arms 14 to one another at their respective second ends 32 to, as noted above, in an embodiment, form an isosceles triangle.

The central insulator 16 includes a core rod 94 formed from a non-conductive material such as fiberglass or a fiberglass-based material. Other suitable materials will be recognized by those skilled in the art. Clamping members 96 are mounted to each end of the rod 94 for mounting the central insulator 16 to the angle arms 14. In an embodiment, the clamping members 96 are clevises or U-shaped members that have legs 98 that secure either side of the central insulator 16 to a respective angle arm 14. The legs 98 can have a bore 100 through which a fastener 102, such as a bolt is inserted, which fasteners 102 insert through the angle arm connecting tab 38, to secure the clamping members 96 to the angle arms 14.

An insulative material 104 is positioned over the core rod 94. In an embodiment the insulative material 104 is formed from a thermoplastic or thermoset materials that are ultra-violet (UV) stabilized for outdoor use. Other suitable materials will be recognized by those skilled in the art. In an embodiment, the insulative material 104 is formed with fins 106 extending transverse to the longitudinal axis $A_{16}$ of the insulator 16 and generally extend fully around the insulator 16.

A centrally located, circumferentially extending ring-like projection 108 is formed around the insulator 16. The projection 108 is configured to cooperate with the recesses 68, 74 formed in the channel 66, 72 formed by the bottom arm tab 60 and the clamping element 70. The insulative material 104 can also be used to confine the bottom leg 18. The projection 108 and recesses 68, 74 are configured and sized to secure the bottom arm 18 in place longitudinally along the central insulator 16, but also to allow the bottom arm 18 to sway or pivot about the insulator 16 in the direction of travel of the cable. Viewed another way, the angle arms 14 and insulator 16 are joined to each other to define a spacer plane $P_{10}$ and the bottom arm 18 is mounted to the insulator 16 to sway into and out of the spacer plane $P_{10}$.

Referring to FIGS. 1 and 2A-2C, the messenger clamp 12 includes an upper clamp portion 110 that is secured to the messenger cable and a lower clamp portion 112 operably mounted to the upper clamp portion 110. The lower clamp portion 112 includes a clevis 114 to which the spacer 10 is mounted.

The upper clamp portion 110 secures to the messenger by a clamp 116 that includes a stationary jaw 118 and a movable jaw 120. The stationary jaw 118 includes a body 122 having an arcuate surface 124 to receive the messenger cable. A central bore 126 is formed in the body 122, in which a mating portion of the movable jaw 120 is fitted. The movable jaw 120 has a clamping surface 128 that cooperates with the arcuate surface 124 to secure the messenger cable therebetween. An internally threaded portion 132 of the movable jaw 120 is positioned in the central bore 126. A threaded element 130, such as a bolt extends into the body 122 and the internally threaded portion 132 of the movable jaw 120 to draw the movable jaw 120 toward the stationary jaw 118 to secure the messenger cable, and to move the movable jaw portion away from the stationary jaw 118 to allow for installing or removing the clamp 12 from the messenger cable.

The upper clamp portion 110 includes a receiver 134 for receiving the lower clamp portion 112. In an embodiment, the receiver 134 has upper 136, side 138 and lower 140 walls that define an opening 142. A slotted opening 144 is formed in the lower wall 140. Bores 146 are formed in the side walls 138 to receive a pin 148, such as the illustrated cotter pin.

The lower clamp portion 112 has a connecting portion 150 having a head 152, a neck 154 extending downwardly from the head 152 and the clevis 114 extending downwardly from the neck 154. The clevis 114 is configured to receive and secure the angle arms 14 with the flat tabs 26 of the angle arms 14 positioned in an open end 158 of the clevis 114 and by the pin or fastener 54, such as he illustrated bolt inserted through the clevis openings and the bushings 50. A preferred fastener 54 includes a smooth shank to facilitate ease of movement of the angle arms 14 about the fastener 54.

The head 152 and neck 154 are configured to cooperate with the upper clamp portion receiver 134 such that the head 152 and neck 154 can be positioned in the receiver 134 when the head 152 is elevated from the receiver lower wall 140, but when the head 152 is lowered onto the lower wall 140, the lower clamp portion 112 cannot be removed from the receiver 134. In an embodiment, a lower portion 162 of the neck 154 has a smaller diameter than an upper portion 164 of the neck 154. The slotted opening 144 in the receiver lower wall 140 is sized to allow the lower neck portion 162 to move through the slot 144, but the upper neck portion 164 (which has a larger diameter) is prevented from moving through the slot 144. In this manner when the head 152 is positioned in the receiver slot 144, it cannot be removed without lifting the head 152 from the receiver lower wall 140. For example, when there is a weight on the lower clamp portion 112 (such as by the spacer 10), under normal loading, the lower clamp portion 112 is maintained in the upper clamp portion 110.

To prevent the lower clamp portion 112 from inadvertently disengaging from the upper clamp portion 110, the locking element 148, such as the illustrated cotter pin, inserted through the clevis side wall bores 146 openings, prevents the head 152 from lifting sufficiently from the lower wall 140 to disengage or dislodge from the receiver 134. That is, the locking pin 148 maintains the lower clamp portion 112 (and thus the spacer 10) the upper clamp portion 110 (and thus the connection to the messenger) together during extreme wind conditions or sudden impact, for example, a tree falling and contacting the cable.

Figure 2:
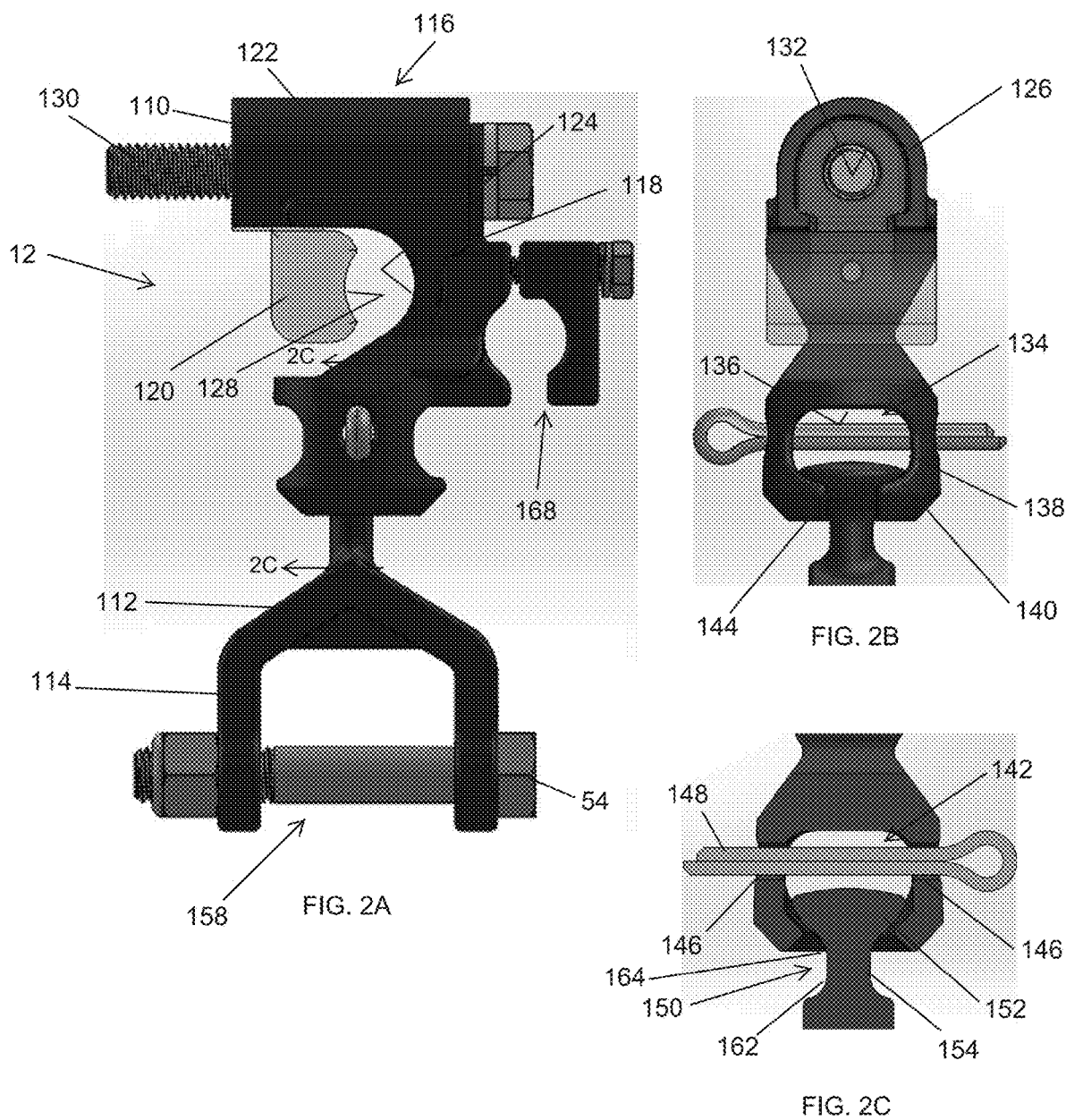
FIG. 2A is a front view of an embodiment of a messenger clamp.
FIG. 2B is a side view of the upper portion of the messenger clamp as viewed from the left-hand side of FIG. 2A.
FIG. 2C is a partial sectional view of the messenger clamp taken along line 2C-2C in FIG. 2A.

As illustrated in FIGS. 1 and 2A, the upper clamp portion 110 can also include an additional clamp element 168, for example, side-mounted to the upper clamp portion 110. The additional clamp element 168 can be used, for example, to secure an additional cable, such as a fiber optic or communication cable. In an embodiment, the additional clamp element 168 is positioned on the upper clamp portion 110 so as to not interfere with the bolt 130 for moving the movable jaw 120 or installing, removing or adjusting the locking element 148. It will be appreciated that the clamp 12 can include more than one additional clamp element 168, and that the additional clamp element(s) 168 can be located at a variety of positions on the clamp 12.

To provide increased degrees of freedom of movement of the present aerial cable spacer insulator 10, the head 152, neck 154 and slotted opening 144 in the receiver lower wall 140 are configured to allow the lower clamp portion 112 to rotate relative to the upper clamp portion 110 and to sway in the direction of travel of the cables, perpendicular to the direction of the cables, or in any direction of movement. In addition, the spacer 10 can sway or rotate about the fastener 54 that secures the spacer 10 to lower clamp portion 112. In this manner, the spacer can sway in the longitudinal direction of the cables and can rotate at an angle to the longitudinal and perpendicular direction of the cables, or any angle in between, to relieve any stresses on the cables and the spacer 10 that may be induced in high wind or inadvertent contact situations. Essentially, the present aerial cable spacer insulator 10 provides a rigid spacer 10 structure with a support clamp 12 having a higher degree of freedom/movement than previously known.

In addition, the solid fiberglass core 94 of the insulator 16 provides stiffness to the spacer 10 structure unlike known spacers. This configuration reduces the need for a central vertical support (between the angle arms' 14 juncture and the bottom arm 18) to provide the needed structural support for the spacer 10. In addition to the permitted movement of the spacer 10 about the messenger clamp 12 and the bottom arm 18 about the insulator 16, the present aerial cable spacer insulator 10 also provides a higher degree of freedom/movement in the direction of the cables relieving stresses that may be induced due to high wind conditions or inadvertent contact situations.

FIG. 8 illustrates an alternate embodiment of the spacer 210 that can be supported from a messenger by the messenger clamp 12. The spacer 210 is in a diamond shape having an upper pair of angle arms 212 and a lower pair of arms 214. The upper arms 214 can be formed in the same manner and from the same materials as the angle arms 14 of the spacer 10 in FIGS. 1, 3 and 4, and have an I-beam cross-section with a relatively flat central section 216 flanked by transverse flanges 218. An end of the upper arms 212 includes a flat tab 220 having an aperture for receiving the messenger clamp bolt 54 when the arms 212 are joined to one another at an apex 222. The upper arms 212 include a cable hook 224 at an end opposite the flat tab 220 and a connecting tab 226 adjacent the cable hook 224.

A pair of insulators 228 form the lower arms 214. In embodiments, the lower arms 214 are formed in much the same manner and from the same materials as the central insulator 16 of the spacer 10 embodiment of FIGS. 1, 3 and 4. Each lower arm 214 includes a non-conductive core rod (not shown) formed from, for example fiberglass. The ends 230 of the lower arms 214 include clamping members 232, such as clevises or U-shaped members for mounting to the upper arm connecting tabs 226 at the sides of the diamond and to each other at the bottom of the diamond. An insulative material 234 formed from, for example, a UV stabilized thermoplastic or thermoset material is positioned over the core rod. The insulative material 234 can be formed with fins 236. Alternately, the lower arms 214 can be formed from a material that does not require a core rod. The spacer 210 can be supported from the messenger using the messenger clamp 12 to provide increased degrees of freedom of movement of the spacer 210 to sway in the direction of travel of the cables, perpendicular to the direction of the cables, or in any direction of movement.

FIG. 9 illustrates another alternate embodiment of the spacer 310, also in a diamond shape, and formed as a unitary member that can be supported from a messenger by the messenger clamp 12. The spacer 310 is formed having an upper pair of angle arms 312 and a lower pair of angle arms 314, all of which can be formed in the same manner and from the same materials as the angle arms 14 of the spacer 10 in FIGS. 1, 3 and 4, having an I-beam cross-section with a relatively flat central section 316 flanked by transverse flanges 318. An apex 320 of the spacer 310 includes an aperture (not shown), and can include a bushing for receiving the messenger clamp bolt 54. Cable hooks 322 are formed at the junctures of the upper and lower arms 312, 314 and at the juncture of the lower arms 314. The spacer 10 can be supported from the messenger using the messenger clamp 12 to provide increased degrees of freedom of movement of the 310 spacer to sway in the direction of travel of the cables, perpendicular to the direction of the cables, or in any direction of movement.

Figure 10:
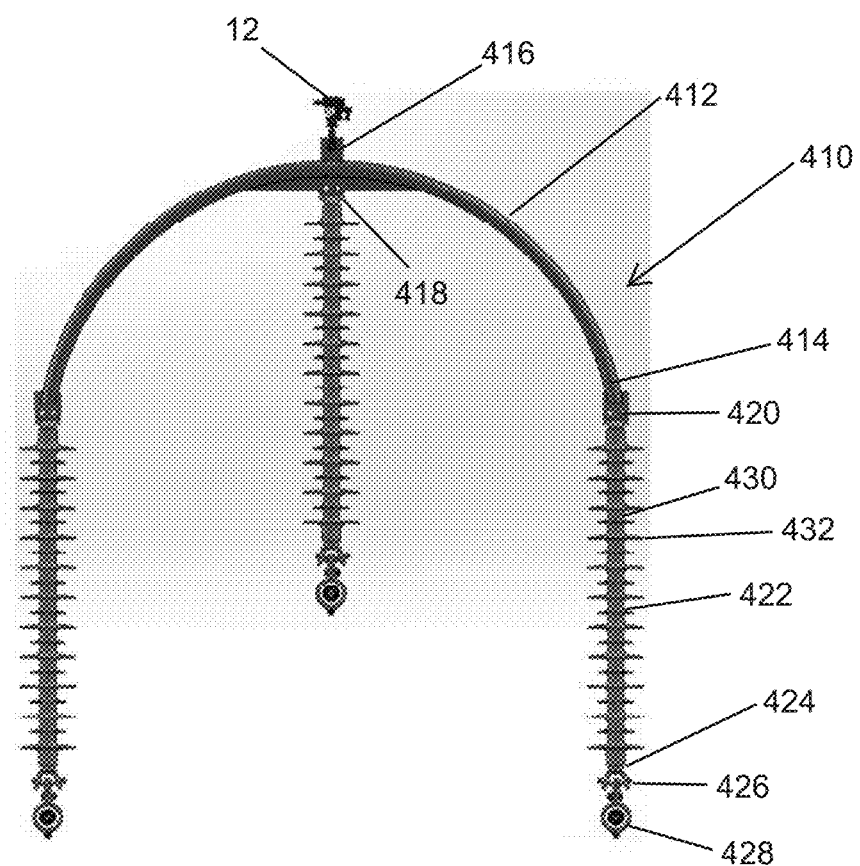
FIG. 10 is a front view of still another embodiment of a spacer.

FIG. 10 illustrates yet another embodiment of the spacer 410 that can be supported from a messenger by the messenger clamp 12. The spacer 410 includes an arcuate body 412 having opposing downwardly curved arms 414 and a clamp hanger 416 at which the spacer 410 is mounted to the messenger clamp 12. The body can be formed from, for example, steel (preferably galvanized or coated). A central insulator hanger 418 is formed opposite the clamp hanger 416, and outboard insulator hangers 420 are formed at the ends of the arms 414. The spacer 410 can include a plurality of insulators 422 mounted to and depending from the central and outboard insulator hangers 418, 420. The insulators 422 can be formed in much the same manner as the central insulator 16 of the spacer 10 embodiment of FIGS. 1, 3 and 4 and include a non-conductive core rod (not shown) formed from, for example fiberglass. The ends 424 of the insulators 422 include clamping members 426, such as clevises or U-shaped members for mounting to the central and outboard insulator hangers 418, 420. Cable clamps 428 positioned at the ends of the insulators 422, clamp and support cables. An insulative material 430 formed from, for example, a UV stabilized thermoplastic or thermoset material is positioned over the core rod. The insulative material 430 can be formed with fins 432. Alternately, the insulators 422 can be formed from a material that does not require a core rod. As with the prior embodiments, when the spacer 410 is supported from the messenger using the messenger clamp 12, it provides increased degrees of freedom of movement of the spacer 410 to sway in the direction of travel of the cables, perpendicular to the direction of the cables, or in any direction of movement.

It will be understood from the present disclosure and a study of the figures that the various members, such as the angle arms 14, 212, 214, 312, 314, bottom arm 18, and the like can be formed in a manner similar to the insulators 16, 418, 420, having a non-conductive support member, such as a fiberglass rod or the like, and a surrounding insulative material, and that such configurations are within the scope and spirit of the present disclosure.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as sides, upper, lower, top, bottom, rearward, forward and the like are, where appropriate, for explanatory purposes only and are not intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

What is claimed is:

1. A cable spacer, comprising:
    a first angle arm having a cable engaging end at a first end and a flat tab portion at a second end, the first end including a connecting tab;
    a second angle arm having a cable engaging end at a first end and a flat tab portion at a second end, the first end including a connecting tab, wherein the first angle arm flat tab and the second angle arm flat tab each include an aperture to accommodate a connecting element to connect the first and second angle arms to each other;
    an insulator extending between and connecting the angle arms, the insulator mounting to the first and second angle arms at their respective connecting tabs, the insulator having a core formed from a non-conductive material, the first and second angle arms and the insulator mounted to each other to define a spacer plane;
    a bottom arm mounted to and depending from the insulator, the bottom arm mounted to the insulator to sway into and out of the spacer plane; and
    further including a messenger clamp mounted to the angle arms at about the flat tabs.

2. The cable spacer of claim 1, wherein the messenger clamp includes an upper clamp portion and a lower clamp portion, the upper clamp portion configured to mounting to a messenger cable and the lower clamp portion configured to mount to the cable spacer angle arms.

3. The cable spacer of claim 2, wherein the lower clamp portion is rotatable relative to the upper clamp portion.

4. The cable spacer of claim 3, wherein the upper clamp portion includes a receiver and the lower clamp portion has a connecting portion that cooperates with the receiver, the connection portion being rotatable within the receiver.

5. The cable spacer of claim 4, wherein in the receiver includes a pair of opposing side walls, the side walls having aligned openings therein for receiving a locking element to secure the connecting portion in the receiver.

6. The cable spacer of claim 5, wherein the receiver includes a bottom wall having a slotted opening extending partially into the bottom wall.

7. The cable spacer of claim 6, wherein the connecting portion includes a head and a neck and wherein the head is positioned in the receiver and the neck extends through the slotted opening.

8. The cable spacer of claim 4, wherein in the lower clamp portion includes a clevis having a pair of opposing side walls, the side walls having aligned openings therein for receiving a fastener for securing the lower clamp portion to the angle arm bushings.

9. A messenger clamp for securing a cable spacer to a messenger cable, comprising:
    an upper clamp portion; and
    a lower clamp portion,
    wherein the upper clamp portion is configured to mount to a messenger cable and the lower clamp portion is configured to mount to cable spacer angle arms; and
    wherein the lower clamp portion is rotatable relative to the upper clamp portion.

10. The messenger clamp of claim 9, wherein the upper clamp portion includes a receiver and the lower clamp portion has a connecting portion that cooperates with the receiver, the connection portion being rotatable within the receiver.

11. The messenger clamp of claim 10, wherein in the receiver includes a pair of opposing side walls, the side walls having aligned openings therein for receiving a locking element to secure the connecting portion in the receiver.

12. The messenger clamp of claim 11, wherein the receiver includes a bottom wall having a slotted opening extending partially into the bottom wall.

13. The messenger clamp of claim 12, wherein the connecting portion includes a head and a neck and wherein the head is positioned in the receiver and the neck extends through the slotted opening.

14. The messenger clamp of claim 9, wherein in the lower clamp portion includes a clevis having a pair of opposing side walls, the side walls having aligned openings therein for receiving a fastener for securing the lower clamp portion to the cable spacer angle arms.

15. The messenger clamp of claim 9, further including a secondary clamp element side-mounted to the upper clamp portion.

16. The messenger clamp of claim 15, wherein the secondary clamp element is positioned on the upper clamp portion.

17. The messenger clamp of claim 15, wherein the secondary clamp element is configured to secure a fiber optic cable.

* * * * *